US012580006B2

(12) United States Patent
Yang et al.

(10) Patent No.: US 12,580,006 B2
(45) Date of Patent: Mar. 17, 2026

(54) OXYGEN PARTIAL PRESSURE REGULATION BY USE OF ORGANIC OXYGEN-BUFFERING MATERIALS SUCH AS TRANSITION METAL SALENS IN HERMETICALLY SEALED ELECTRONIC DEVICES ENVIRONMENT AND RELATED ASSEMBLIES AND METHODS

(71) Applicant: Western Digital Technologies, Inc., San Jose, CA (US)

(72) Inventors: Dan-Hui Dorothy Yang, Sunnyvale, CA (US); Ruihua Li, Cupertino, CA (US); Guang Li, Cupertino, CA (US); David Andrew Dudek, Scotts Valley, CA (US); Dongying Li, San Jose, CA (US); Qing Dai, San Jose, CA (US); Chun Zhou, San Jose, CA (US); Gary Te-Yung Liu, Campbell, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/757,069

(22) Filed: Jun. 27, 2024

(65) Prior Publication Data

US 2026/0004818 A1 Jan. 1, 2026

(51) Int. Cl.
*G11B 33/14* (2006.01)
*C01B 13/02* (2006.01)
(Continued)

(52) U.S. Cl.
CPC ...... *G11B 33/1486* (2013.01); *C01B 13/0288* (2013.01); *G11B 5/455* (2013.01);
(Continued)

(58) Field of Classification Search
None
See application file for complete search history.

(56) References Cited

U.S. PATENT DOCUMENTS 5,945,079 A * 8/1999 Mullhaupt ........... B01J 20/3204 423/219
7,719,792 B2 * 5/2010 Strom .................. G11B 25/043 360/97.16
(Continued)

FOREIGN PATENT DOCUMENTS

JP H11106736 A * 4/1999

OTHER PUBLICATIONS

Moller, Mads Sondrup et al., "Structure Activity Relationships for Reversible O2 Chemisorption by the Solid Phases of Co(salen) and Co(3F-salen)", JACS Au, May 4, 2023; https://doi.org/10.1021/jacsau.3c00134; 12 pages.
(Continued)

*Primary Examiner* — William J Klimowicz
(74) *Attorney, Agent, or Firm* — LOZA & LOZA, LLP; Gabriel Fitch

(57) ABSTRACT

An oxygenating system for treating an atmosphere of a magnetic storage device can include an oxygenating material inside a sealed casing of the magnetic storage device and comprising an oxygenated salen of formula (I):
(Continued)

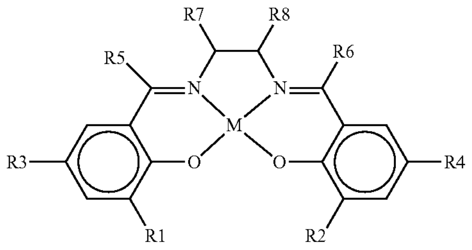

(I)

where M can be a metal selected from Co, Ni, Mn, Fe or Cu, and R1, R2, R3, R4, R5, R6, R7 and R8 are independently substitutions on aromatic and ethylene diamine portions such as, but not limited to, H, F, Cl, Br, I, carbonyl, carboxyl, hydroxyl, alkyl, aryl, amine, amide, nitro, or other typical electron withdrawing groups or electron donating groups.

28 Claims, 8 Drawing Sheets

(51) Int. Cl.
*G11B 5/455* (2006.01)
*G11B 5/00* (2006.01)

(52) U.S. Cl.
CPC ................. *C01B 2210/0004* (2013.01); *C01B 2210/0006* (2013.01); *C01B 2210/0009* (2013.01); *G11B 2005/0021* (2013.01)

(56) References Cited

U.S. PATENT DOCUMENTS

| | | | | |
|---|---|---|---|---|
| 8,014,104 | B2 | 9/2011 | Cheng et al. | |
| 8,268,048 | B2 | 9/2012 | Subramaniam et al. | |
| 8,885,287 | B1 | 11/2014 | Koike et al. | |
| 10,468,071 | B1 | 11/2019 | Tasaka et al. | |
| 10,957,363 | B1 * | 3/2021 | Brand | G11B 33/1486 |
| 10,964,354 | B1 | 3/2021 | Turner et al. | |
| 11,024,343 | B2 | 6/2021 | Luebben et al. | |
| 11,270,739 | B1 * | 3/2022 | Zhang | G11B 33/1453 |
| 11,355,161 | B2 * | 6/2022 | Luebben | H05K 5/0217 |
| 12,183,371 | B1 * | 12/2024 | Goodman | B01D 53/261 |
| 2001/0003950 | A1 * | 6/2001 | Zhang | C01B 13/0262 95/138 |
| 2016/0264512 | A1 * | 9/2016 | Groves | C07C 233/14 |
| 2024/0110901 | A1 * | 4/2024 | Thomas | G11B 33/14 |
| 2025/0131946 | A1 * | 4/2025 | Li | G11B 25/043 |

OTHER PUBLICATIONS

Sundberg, Jonas et al., “Oxygen Chemisorption/Desorption in a Reversible Single-Crystal-to-Single-Crystal Transformation”, Chemical Science; 2014; Issue 10; https://pubs.rsc.org/en/content/articlelanding/2014/sc/c4sc01636j; 9 pages.

Moller, Mads Sondrup, “Activation of Dioxygen and Nitric Oxide by Transition Metal Materials”, University of Southern Denmark; Ph.D. Thesis; Last accessed Jun. 27, 2024; https://portal.findresearcher.sdu.dk/en/publications/activation-of-dioxygen-and-nitric-oxide-by-transition-metal-mater/publications/; 5 pages.

* cited by examiner

OXYGEN PARTIAL PRESSURE REGULATION BY USE OF ORGANIC OXYGEN-BUFFERING MATERIALS SUCH AS TRANSITION METAL SALENS IN HERMETICALLY SEALED ELECTRONIC DEVICES ENVIRONMENT AND RELATED ASSEMBLIES AND METHODS

FIELD

The disclosure relates to hermetically sealed electronic devices such as magnetic storage devices, and more particularly, to devices including transition metal complexes that can gradually release oxygen to maintain the level of oxygen in the environment inside the magnetic storage device. The disclosure also relates to the assemblies and composite materials to house these chemicals and a barrier to control oxygen transmission into the gaseous phase of the magnetic storage device and methods thereof.

INTRODUCTION

Magnetic storage systems, such as a hard disk drive (HDD), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players. Magnetic storage systems/devices, such as an HDD, network attached storage (NAS), and the like, are utilized broadly in cloud storage and other data centers.

Heat assisted magnetic recording (HAMR) is a recording technique that can increase the areal density capability of writing data on a magnetic storage medium having very high coercivity with high-temperature assistance. A certain level of oxygen may be needed in a HAMR drive to attain better performance, as is discussed in U.S. Pat. No. 10,468,071. Oxygen is believed to react with inorganics or organics present in the HDD, or other electronic devices, to form gaseous products that can be transported away to reduce the material accumulation on the surface of device components. Therefore, oxygen levels decrease gradually without replenishing. There is accordingly a need to address this problem and maintain the device in the as-built conditions to have optimal performance throughout their service life.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, this disclosure provides an oxygenating system for treating an atmosphere of a magnetic storage device, the system comprising: an oxygenating material inside a sealed casing of the magnetic storage device, the oxygenating material comprising an oxygenated salen (e.g., oxygenated transition metal salen) of formula (I):

(I)

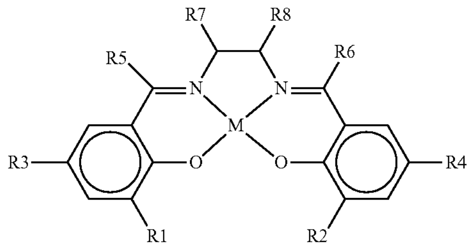

where M is a metal selected from Co, Ni, Mn, Fe or Cu, and R1, R2, R3, R4, R5, R6, R7 and R8 are independently H, F, Cl, Br, I, carbonyl, carboxyl, hydroxyl, alkyl, aryl, amine, amide, nitro, or an electron donating group or an electron withdrawing group.

In one aspect, the oxygenating system described above, wherein R1 and R2 are F.

In one aspect, the oxygenating system described above, wherein R1 and R2 are H.

In one aspect, the oxygenating system described above, wherein M is Co and R1, R2, R3, R4, R5, R6, R7 and 8 are H, and the oxygenating material is referred to as Co(salen), wherein the Co(Salen) has at least one of the following crystalline structures: γCo(salen); δCo(salen); εCo(salen); or ζCo(salen).

In one aspect, the oxygenating system described above, wherein more than one Co(salen) crystalline structure is present so as to effuse oxygen at different temperatures.

In one aspect, the oxygenating system described above, wherein the oxygenating material further comprises at least one inorganic material selected from the group consisting of permanganates, peroxides, percarbonates and combinations thereof.

In one aspect, the oxygenating system described above, wherein the salen is Co(salen), and the Co(salen) is mixed with at least one of Co(3F-salen) and Co(5F-salen) to control the oxygen releasing profile.

In one aspect, the oxygenating system described above, wherein the oxygenating material is inside a cell inside the sealed casing of the magnetic storage device, and wherein an oxygen permeable membrane covers an opening in the cell.

In one aspect, the oxygenating system described above, wherein the oxygen permeable membrane comprises at least one of low density polyethylene, high density polyethylene, ethylene vinyl acetate, polyurethane, polyvinyl alcohol, or isoprene rubber, and wherein the cell is gas-impermeable and comprises at least one of aluminum, steel, nickel, zinc or plastic.

In one aspect, the oxygenating system described above, wherein the oxygenating material is in the form of a powder or tablets.

In one aspect, the oxygenating system described above, wherein the oxygenating material is coated on zeolites or nanotubes.

In one aspect, a magnetic storage device comprising: the oxygenating system described above; a temperature control device configured to control the temperature of the oxygenating material; a temperature sensor; a pressure sensor; a valve configured to vent the cell; and a controller configured to control the temperature control device and the valve based on data from at least one of the temperature sensor or the pressure sensor, to control the temperature of the oxygenating material.

In one aspect, the oxygenating system described above, wherein the temperature control device comprises a laser inside the sealed casing, the laser being configured to heat the oxygenating material.

In one aspect, the oxygenating system described above, further comprising an oxygen sensor and a pressure sensor inside the sealed casing, and the sealed casing encloses an atmosphere containing He.

In one aspect, a magnetic storage device comprising: the oxygenating system described above; at least one magnetic head inside the sealed casing; a magnetic recording medium inside the sealed casing; a drive mechanism for positioning the at least one magnetic head over the magnetic recording medium; and a controller electrically coupled to the at least one magnetic head for controlling operation of the at least one magnetic head.

In one aspect, the oxygenating system described above, wherein the oxygenating material is incorporated into paint.

In one aspect, this disclosure also provides an oxygenating system for treating an atmosphere of a magnetic storage device, comprising: an oxygenating material inside a sealed casing of the magnetic storage device, the oxygenating material comprising an oxygenated salen of formula (II):

(II)

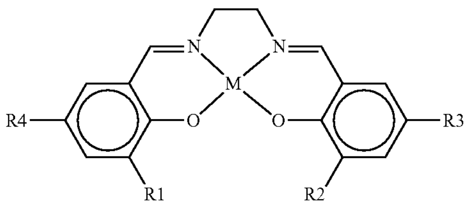

where M is a metal selected from Co, Mn, Fe or Cu, and R1, R2, R3 and R4 are independently selected from F, Br, I, Cl, an alkyl group, an electron donating group or an electron withdrawing group.

In one aspect, the oxygenating system described above, wherein M is Co and R1, R2, R3 and R4 are independently H or F.

In one aspect, the oxygenating system described above, wherein M is Co and R1, R2, R3 and R4 are H.

In one aspect, the oxygenating system described above, wherein the salen is Co(salen), and the Co(salen) is mixed with at least one of Co(3F-salen) and Co(5F-salen) to control the oxygen releasing profile in the magnetic storage device.

In one aspect, the oxygenating system described above, wherein the oxygenating material is inside a cell inside the sealed casing of the magnetic storage device, and wherein an oxygen permeable membrane covers an opening in the cell.

In one aspect, the oxygenating system described above, wherein the oxygenated salen comprises formula (IIa):

(IIa)

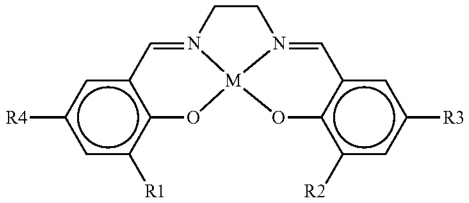

wherein M is Co and R1, R2, R3 and R4 are H, and the oxygenating material is referred to as Co(salen), wherein the Co(Salen) has at least one of the following crystalline structures: γCo(salen); δCo(salen); εCo(salen); or ζCo (salen).

In one aspect, the oxygenating system described above, wherein more than one Co(salen) crystalline structure is present so as to effuse oxygen at different temperatures.

In one aspect, the oxygenating system described above, wherein the oxygenating material is inside a cell inside the sealed casing of the magnetic storage device, and wherein an oxygen permeable membrane covers an opening in the cell.

In one aspect, the oxygenating system described above, wherein the oxygenating material is in the form of a powder or tablets; wherein the oxygenating material is coated on zeolites or nanotubes; or wherein the oxygenating material is incorporated into paint.

In one aspect, the oxygenating system described above, wherein the oxygenating material comprises more than one of the oxygenated salen to control an oxygen releasing profile in the magnetic storage device.

In one aspect, a magnetic storage device comprising: the oxygenating system described above; at least one magnetic head inside the sealed casing; a magnetic recording medium inside the sealed casing; a drive mechanism for positioning the at least one magnetic head over the magnetic recording medium; and a controller electrically coupled to the at least one magnetic head for controlling operation of the at least one magnetic head.

as a regulator in an HDD at 60° C. with oxygen starting at about 10% according to aspects of the disclosure.

Figure 7:
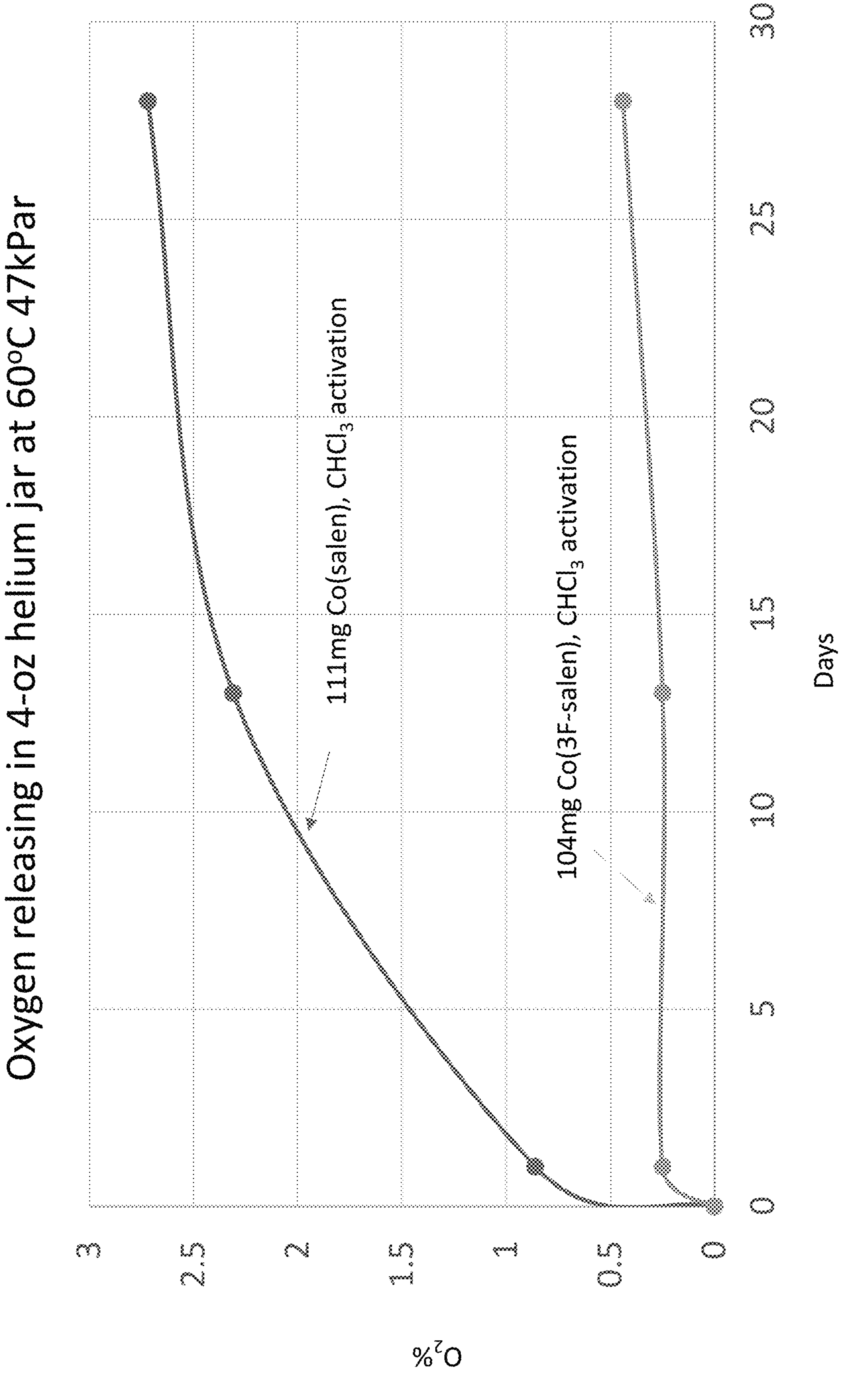

FIG. 7 is a chart showing the generation of $O_2$ in a 100% He atmosphere from Co(salen) and Co(3F-salen) at 60° C. according to aspects of the disclosure.

Figure 8:
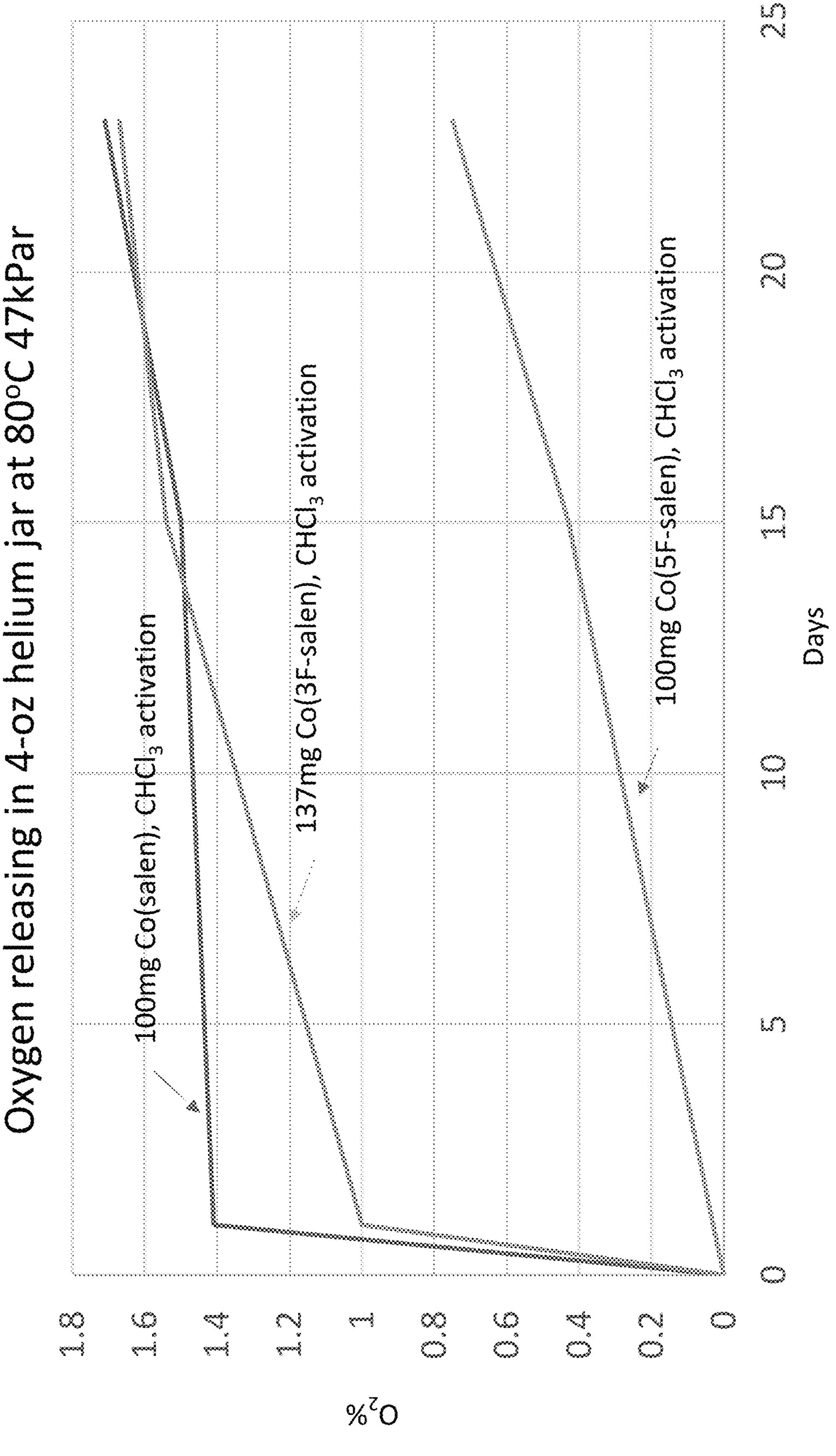

FIG. 8 is a chart showing the generation of $O_2$ in a 100% He atmosphere from Co(salen), Co(3F-salen) and Co(5F-salen) at 80° C. according to aspects of the disclosure.

DETAILED DESCRIPTION

Maintaining oxygen ($O_2$) levels in hermetically sealed electronic devices, such as but not limited to HDDs configured for HAMR, can be important to achieve longer lifetimes and lower failure rates. Initially oxygen is mixed with other gases such as helium and injected into the devices before sealing. But $O_2$ levels in HAMR drives decrease over time from the initial fill. The present disclosure involves the use of transition metal salen complexes as an oxygen carrier that can release oxygen at elevated temperature to compensate for the loss of oxygen in HAMR drives.

Transition metal salen complexes such as Co(salen) and chemically modified Co(salen) such as Co(3F-salen) were reported to absorb oxygen in air at ambient temperature and release oxygen at elevated temperature. This property can be used to maintain optimal oxygen level in electronic devices such as, but not limited to, HAMR drives. The metal salens are typified by the structures shown in Formula (I):

Formula (I)

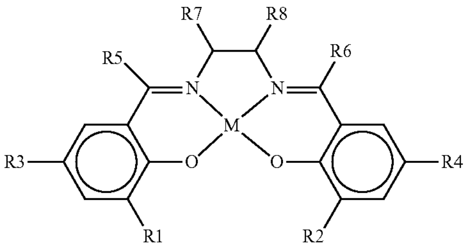

where M can be a metal selected from Co, Ni, Mn, Fe or Cu, and R1, R2, R3, R4, R5, R6, R7 and R8 are independently substitutions on aromatic and ethylene diamine portions such as, but not limited to, H, F, Cl, Br, I, carbonyl, carboxyl, hydroxyl, alkyl, aryl, amine, amine derivatives, amide, amide derivatives, nitro, or other typical electron withdrawing groups or electron donating groups as would be recognized by a skilled artisan. In general, electron withdrawing group substitutions tend to increase the oxygen releasing temperature, and electron donating group substitutions tend to decrease the oxygen releasing temperature. This property is vital for oxygen releasing inside electronic devices. The substitutions can be tuned based on the operating temperature of the device and the required speed of oxygen release to compensate for the gradual loss of the original oxygen.

In an embodiment, R5, R6, R7 and R8 may be hydrogen. Then simplified structures may be in accordance with Formula (II):

(II)

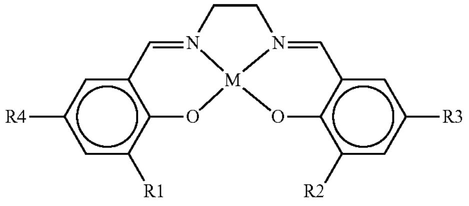

where M can be a metal selected from Co, Ni, Mn, Fe or Cu, and R1, R2, R3 and R4 are independently substitutions on aromatic portions such as, but not limited to, H, F, Cl, Br, I, carbonyl, carboxyl, hydroxyl, alkyl, aryl, amine and amine derivatives, amide, amide derivatives, nitro, or other typical electron withdrawing groups or electron donating groups as would be recognized by a skilled artisan. In general, electron withdrawing group substitutions tend to increase the oxygen releasing temperature, and electron donating group substitutions tend to decrease the oxygen releasing temperature. This property is important for oxygen releasing inside electronic devices. The substitutions can be tuned based on the operating temperature of the device and the required speed of oxygen release to compensate for the gradual loss of the original oxygen.

In one embodiment, the use of mixtures of two or more transition metal salen complexes may be necessary to compensate for the expected oxygen loss (e.g., in accordance with an oxygen depletion profile) when the electronic device starts to operate. The transition metal salen complexes are selected based on their thermostability and speed of oxygen release. For example, fast, medium, and slow oxygen releasing transition metal salen complexes may be mixed together to have a sustained short term and long-term oxygen supply.

In another embodiment, the transition metal salen complex bulk crystalline phase structure contributes to its oxygen binding capacity, releasing temperature and speed. Among many forms of nanocrystalline structure of the simplest Co(salen) without any substitution, only γ, δ, ε and ζ phases are capable of oxygen binding and releasing. The γ, δ, ε phases of the Co(salen) are crystallized from solvents such as methylene chloride, chloroform, and benzene. The ζ phase of the Co(salen) is crystalized from solvent such as pyridine. Co(3F-salen) crystalizing from pyridine and piperidine forms F-lined channels to facilitate oxygen transport. Making transition metal salen complexes with specific crystalline structures is a process termed as activation. Table 1 below lists some examples of Co(salen) and Co(3-F salen) activation and corresponding oxygen binding capacity.

TABLE 1

Examples of Co(salen) and Co(3-F salen) activation and corresponding oxygen binding capacity.

| No. | Solvent | Δ ° C. for apical ligands removal | Crystalline forms and oxygen binding capacity |
|---|---|---|---|
| 1 | $CHCl_3$ | 60 | γCo(salen) $\leftrightarrow$ Co(salen)$(O_2)_{1/3}$ |
| 2 | $C_6H_6$ | 80 | δCo(salen) $\leftrightarrow$ Co(salen)$(O_2)_{1/4}$ |
| 3 | $CH_2CH_2$ | 40 | εCo(salen) $\leftrightarrow$ Co(salen)$(O_2)_{1/5}$ |
| 4 | pyridine | 170/0.05 mbar | ζCo(salen) $\leftrightarrow$ Co(salen)$(O_2)_{1/2}$ |
| 5 | $H_2O$ | 100 | αCo(3F-salen) $\leftrightarrow$ αCo(3F-salen)$(O_2)_{1/2}$ |
| 6 | pyridine | 160/0.05 mbar | βCo(3F-salen) $\leftrightarrow$ βCo(3F-salen)$(O_2)_{1/2}$ |
| 7 | piperidine | 140/0.05 mbar | γCo(3F-salen) $\leftrightarrow$ γCo(3F-salen)$(O_2)_{1/2}$ |

Besides the solvents in the above table, other commonly used solvents, in which transition metal salen complexes can recrystallize from, may be used including toluene, dimethyl formamide (DMF), dimethyl sulfoxide (DMSO), organic alcohols such as methanol, ethanol, propanol, isopropanol, etc. Therefore, the configurable chemical and physical properties of transitional metal salen complexes are enormous and available to suit the oxygen replenishment needs of electronic devices. Mixtures of different complexes with the same solvent activation can be used, or one can utilize the same complex with different solvent activations, or one can use the mixture of different transition metal complexes with different solvent activations.

Another advantage of transition metal salen complexes as an oxygen modulator is that oxygen absorption and desorption is reversible. It can be mixed with other inorganic oxidizing agents such as peroxide, percarbonate, permanganate, and others that can be easily recognized by people skilled in the art. If the oxygen level is high in the electronic device, it can absorb oxygen, and then release oxygen when the oxygen level is low. At the start, the metal complexes may have no oxygen, or be partially oxygenated, but they absorb oxygen generated by the other inorganic oxidizing agents. One advantage is to prevent an oxygen surge by rapid oxygen release from these inorganic oxidizing agents early in the lifetime of the HDD.

Transition metal salen complexes release oxygen typically at higher temperatures than temperatures where they absorb oxygen. Oxygen absorption typically accompanies a color change to a darker tone or almost black, while oxygen releasing typically accompanies color change to a lighter tone such as brown or reddish brown. Temperature generally increases as an electronic device operates, and that can aid the oxygen release especially for transition metal complexes with electron donating substitutions. As an alternative, a heating device can be implemented to heat the transition metal complexes to accelerate the oxygen release if needed.

In various embodiments, a chamber houses the transition metal complexes with or without heating, a membrane acts as a barrier to optimize drive performance, and transition metal complexes can be powder, tablet or deposited onto other porous structures such as zeolite.

HAMR System for Employing Transition Metal Salens for Oxygen Regulation

Figure 1A:
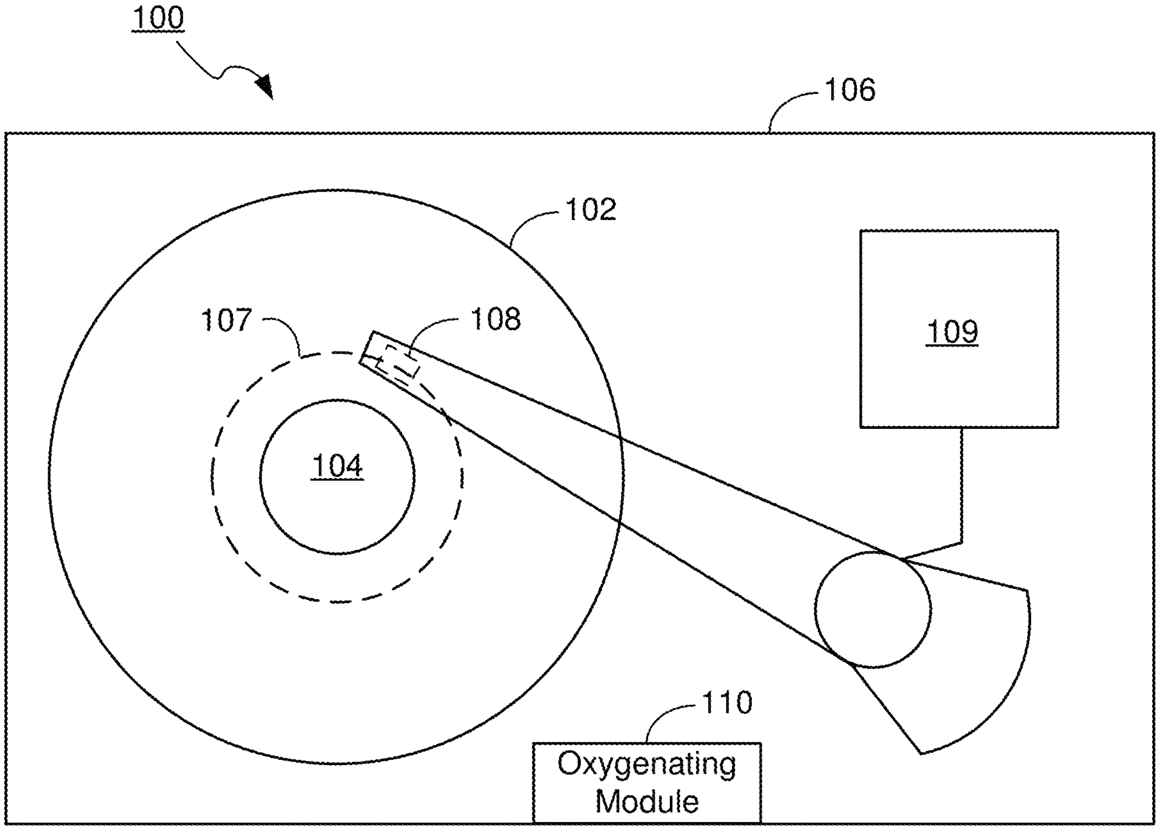
FIG. 1A is a diagram schematically illustrating a data storage device, such as a hard disk drive (HDD), configured for heat assisted magnetic recording (HAMR), including a slider, a magnetic recording medium, and an oxygenation module for regulating oxygen content in the drive, in accordance with one aspect of the disclosure.

FIG. 1A is a top schematic view of a data storage device 100 (e.g., disk drive or magnetic recording device) configured for heat assisted magnetic recording (HAMR) including a slider 108, a magnetic recording medium 102, which may be a single or multiple disks, and an oxygenation module 110 for regulating oxygen content in the drive according to one or more aspects of the disclosure. The laser (not visible in FIG. 1A but see 114 in FIG. 1B) is positioned with a head/slider 108. Disk drive 100 may include one or more disks/media 102 to store data. The disks/media 102 reside on a spindle assembly 104 that is mounted to a drive housing 106. Data may be stored along tracks in the magnetic recording layer of disk 102. The reading and writing of data are accomplished with the head 108 (slider) that may have both read and write elements (108*a* and 108*b*). The write element 108*a* is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 109 (e.g., a microcontroller). It is noted that while an example HAMR system is shown, the various embodiments described may be used in other EAMR or non-EAMR magnetic data recording systems, including perpendicular magnetic recording (PMR) disk drives or magnetic tape drives. The housing/casing 106 seals the data storage device so as to contain a helium atmosphere. In operation, and as will be described in detail below, the oxygenation module 110 can be used to control, or maintain, a level of the oxygen contained in the data storage device 100. In one aspect, the oxygenation module 110 is positioned within a sealed enclosure of the data storage device 100.

Figure 1B:
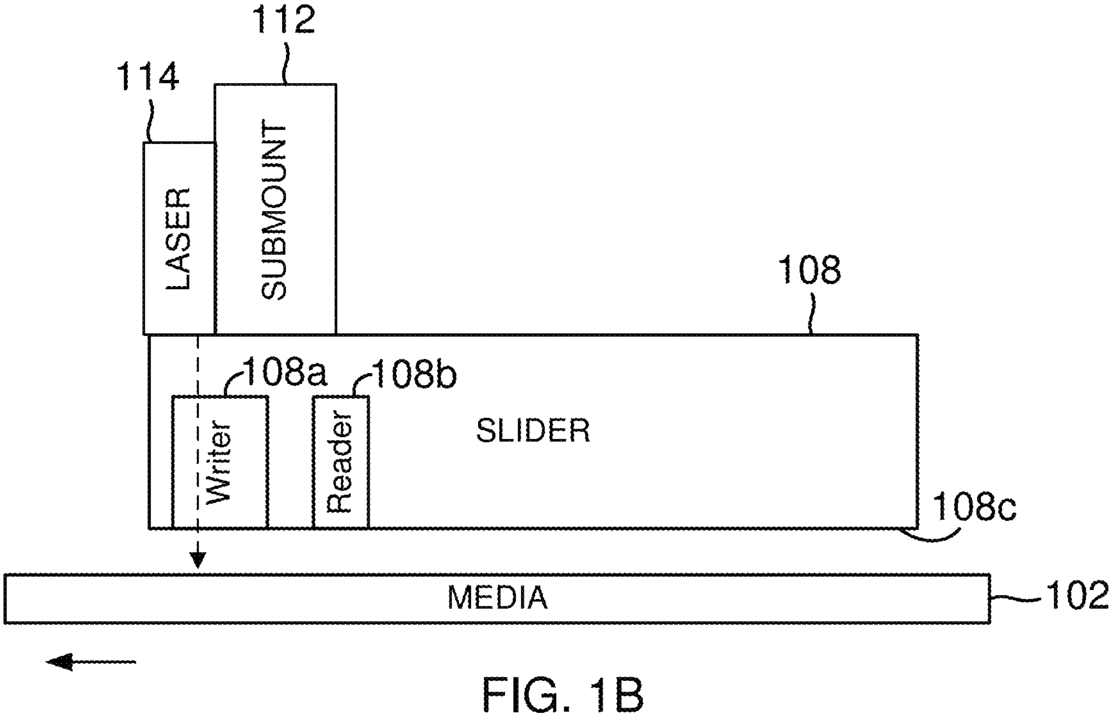
FIG. 1B is a side schematic view of the slider and magnetic recording medium of FIG. 1A in accordance with one aspect of the disclosure.

FIG. 1B is a side schematic view of the head/slider 108 and magnetic recording medium 102 of FIG. 1A. The slider 108 may include a sub-mount 112 attached to a top surface of the slider 108. The laser 114 may be attached to the sub-mount 112, and possibly to the slider 108. The slider 108 includes a write element (e.g., writer) 108*a* and a read element (e.g., reader) 108*b* positioned along an air bearing surface (ABS) 108*c* of the head/slider for writing information to, and reading information from, respectively, the medium 102. In other aspects, the slider may also include a layer of the lubricant (not shown).

In operation, the laser 114 is configured to generate and direct light energy to a waveguide (possibly along the dashed line) in the slider which directs the light to a near field transducer (NFT) near the air bearing surface (e.g., bottom surface) 108*c* of the head/slider 108. Upon receiving the light from the laser 114 via a waveguide, the NFT generates localized heat energy that heats a portion of the medium 102 near the write element 108*a* and the read element 108*b*. The anticipated recording temperature is in the range of about 350° C. to 400° C. In the aspect illustrated in FIG. 1B, the laser directed light is disposed between the writer 108*a* and a trailing edge of the slider. In other aspects, the laser directed light may instead be positioned between the writer 108*a* and the reader 108*b*. FIGS. 1A and 1B illustrate a specific aspect of a HAMR system. In other aspects, the oxygenation module 110 of the disclosure can be used in other suitable HAMR systems (e.g., with other HDDs configured for HAMR and in need of oxygen regulation).

Figure 2:
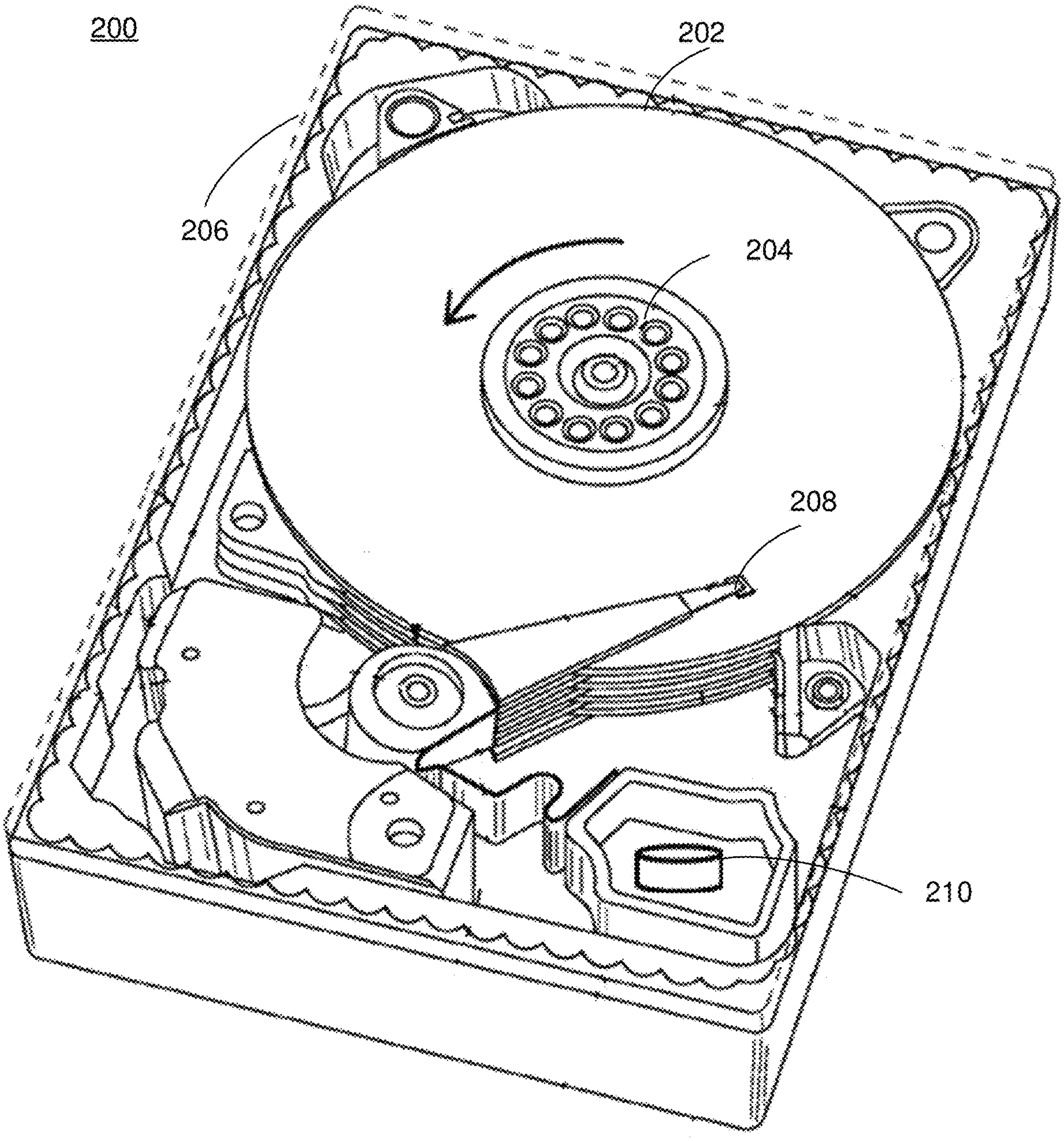
FIG. 2 is a perspective view of an HDD having multiple magnetic recording mediums/disks and an oxygenation module for regulating oxygen content in the HDD in accordance with one aspect of the disclosure.

FIG. 2 is a perspective view of a hard disk drive (HDD) 200 having multiple magnetic recording medium/disks 202 and an oxygenation module 210 for regulating oxygen content in the HDD in accordance with one aspect of the disclosure. The HDD 200 may be configured for heat assisted magnetic recording (HAMR) and includes a slider 208 and magnetic recording mediums/disks 202, which in this configuration has multiple disks. A laser (not shown) may be positioned with the head/slider 208. Disk drive 200 includes multiple disks/media 202 to store data. The disks/media 202 reside on a spindle assembly 204 that is mounted to a drive housing 206. Data may be stored along tracks in the magnetic recording layer of one of the disks 202. The reading and writing of data are accomplished with the head 208 (slider) that may have both read and write elements. In one aspect, HDD 200 may operate in the manner described above for HDD 100 shown in FIGS. 1A and 1B. In one aspect, the disks 202 may have a layer structure. A passive oxygenation module or cell 210 (similar to or the same as the oxygenation module 110 of FIG. 1) is disposed along a wall of the housing or casing 206. In other examples, it may be positioned at other locations within or along the casing or housing or casing 206.

Atmospheric Stability in HAMR Systems

Maintaining stability in the atmosphere surrounding a hard disk drive system such as an HDD configured for HAMR optimizes the performance of the drive by reducing any effects on drive performance arising from fluctuations of the atmosphere. The drive atmosphere can typically be about 90% helium and about 10% oxygen. When an HDD is first manufactured, the atmosphere, including the oxygen level, is set within a sealed enclosure of the drive. Over time, the oxygen level can deviate from the original level, or otherwise fluctuate to a non-ideal level, such that drive performance is reduced. This disclosure is directed to an oxygenating module for an HDD configured to control the oxygen level in the HDD.

Any number of factors may cause deviations in the oxygen level of the drive. One of the phenomena that may cause such deviations, that aspects of this disclosure addresses, is the production of a fluorinated carbonaceous ($CF_x$) or nitrogenated carbonaceous material ($CN_x$) smear when the HAMR medium is irradiated with a laser. The smear mechanism works on the surface of a magnetic recording medium that has a magnetic layer topped with a capping layer, a protective carbon overcoat layer and a layer of lubricant. Under laser irradiation (e.g., high heat from a near field transducer or NFT) at some initial time, nitrogenated carbonaceous material may be formed in the carbon overcoat layer. As time proceeds, more nitrogenated carbonaceous material may be formed, and some of the nitrogenated carbonaceous material and some of the lubricant make their way on to the NFT. This smear deteriorates the performance of the medium and the HAMR system (e.g., operation of the slider, NFT and medium to record and read information), such that the flying height (FH) of the slider/NFT gradually increases. This increased flying height lowers the recording performance of the HAMR system since the read and write operations on the media occur at a greater distance from the slider (containing the NFT and read and write elements). As mentioned above, this smear is only one of multiple factors that may cause deviations in the oxygen level of the drive.

In one aspect of the disclosure, Co(salen) and chemically modified Co(salen) such as Co(3F-salen) absorb oxygen in air at ambient temperature and release oxygen at elevated temperature.

Use of Transition Metal Salens to Regulate Oxygen

In an aspect of the disclosure, the Co(salen) compound is crystallized from a solvent to obtain Co(salen) solvent materials that have different phases and different oxygen absorption properties. These phases include α, β, γ, δ, ε and ζ phases. In an embodiment, the salen compound has Formula (III):

(III)

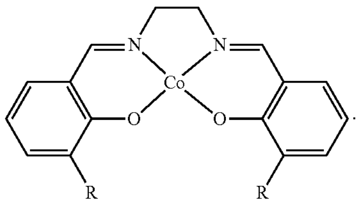

R = H Co(salen)
R = F Co(3F-salen)

In order for the metal salen to absorb oxygen, it is recrystallized from a solvent so as to form a solvent/metal salen complex which, upon oxygenation, will have oxygen replace the solvent in the crystal lattice. These solvents can include $CHCl_3$, $CH_2CH_2$, benzene toluene, dimethyl formamide (DMF), dimethyl sulfoxide (DMSO), piperidine, pyridine and organic alcohols such as methanol, ethanol, propanol, isopropanol, etc. Toluene may be used instead of benzene, which is a known carcinogen.

Synthesis of the metal salen complexes of the disclosure may be achieved through the utilization of tetradentated Schiff base ligands. The Schiff base $H_2$Salen, may be prepared by the condensation of ethylenediamine (en) or substituted ethylenediamine with salicylaldehyde (Sal), substituted salicylaldehyde, o-hydroxyaceto-phenone (o-Hac), respectively, in a molar ratio of 1:2. The structures may be identified by elemental analysis, infrared spectroscopy, uv-visible spectroscopy and 1H NMR spectroscopy. The resulting ligands has Formulas (I):

(I)

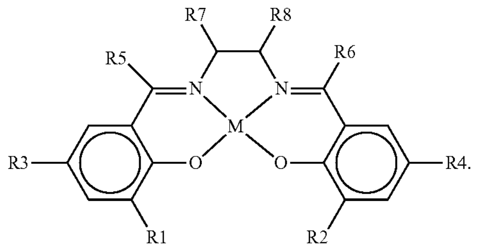

In Formula (I), when R1-R8=H the product is $H_2$Salen, and when R5=R6=$CH_3$ and the rest of the substitutions are H, the product is $H_2$oHacen. These ligands can be reacted with Ni(II), Co(II) or Mn(II), for example to yield the corresponding tetadentate Schiff base transition metal complexes.

The transition metal salens deoxygenate and change color from black to lighter colors during heating. It is observed that upon heating in a stream of nitrogen at 100° C., oxygenated γ-Co(selen) ($CHCl_3$ solvent), oxygenated δ-Co (salen) ($C_6H_6$ solvent) and oxygenated ε-Co(selen) ($CH_2Cl_2$ solvent) reform their respective deoxy phases, i.e., effuse oxygen. This is accompanied by color changes from black to hues between red and brown. The other phases will require hotter temperatures to deoxygenate. Cooling the salen in an oxygen containing atmosphere such as air, will result in the metal salen re-oxygenating and returning to a black color.

Figure 3:
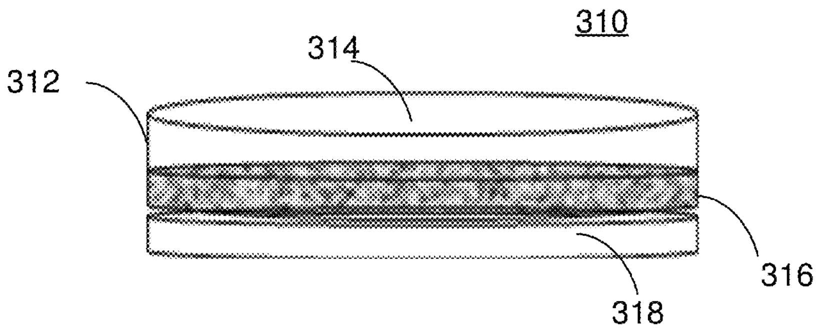
FIG. 3 is a diagram of a passive oxygenation module in accordance with an aspect of the disclosure.

FIG. 3 is a schematic diagram of the oxygenation module/cell 310, which corresponds to the oxygenation/module cell 210 depicted in the perspective view of the HDD of FIG. 2. The oxygenation module 310 includes an outer case or cell 312, the top of which has an opening covered by an $O_2$ permeable membrane 314. Inside the case or cell 312 is the oxygenated metal salen 316 of the disclosure, which may be in the form of a powder, a pellet, a solid or is disposed on a woven material. The oxygenated metal salen can also be disposed on a zeolite, a nanotube or other nanomaterial. The nanotube or nanomaterial can be carbon based. An inorganic material such as permanganates, peroxides, percarbonates or the like may be mixed with the metal salen. The cell 310 may be made from a metal (e.g., a gas permeable or gas impermeable metal enclosure) such as steel, aluminum, zinc or nickel. The metal can be made gas permeable by sintering. Alternately, the cell may be formed from a gas permeable or gas impermeable plastic such as an acrylate, a methacrylate or a polyurethane. Optionally, there could be a heating element 318 inside the outer casing of the HDD or attached to the outer casing of the HDD. However, the heating element may not be required, since heat will be supplied by the operation of the drive itself. The oxygenation module can contain a sufficient amount of the metal salen to last for the lifetime of the drive and still be relatively small in size. For example, it can be the size of a button cell battery with a diameter of from 2 cm to 5 cm. The oxygenation module can also include an oxygen sensor and a controller (not shown). In the example illustrated in FIG. 3 and described above, the oxygenation module or cell 310 is referred to as being passive. In other aspects, it may be passive or active as will be described in greater detail below.

Figure 4:
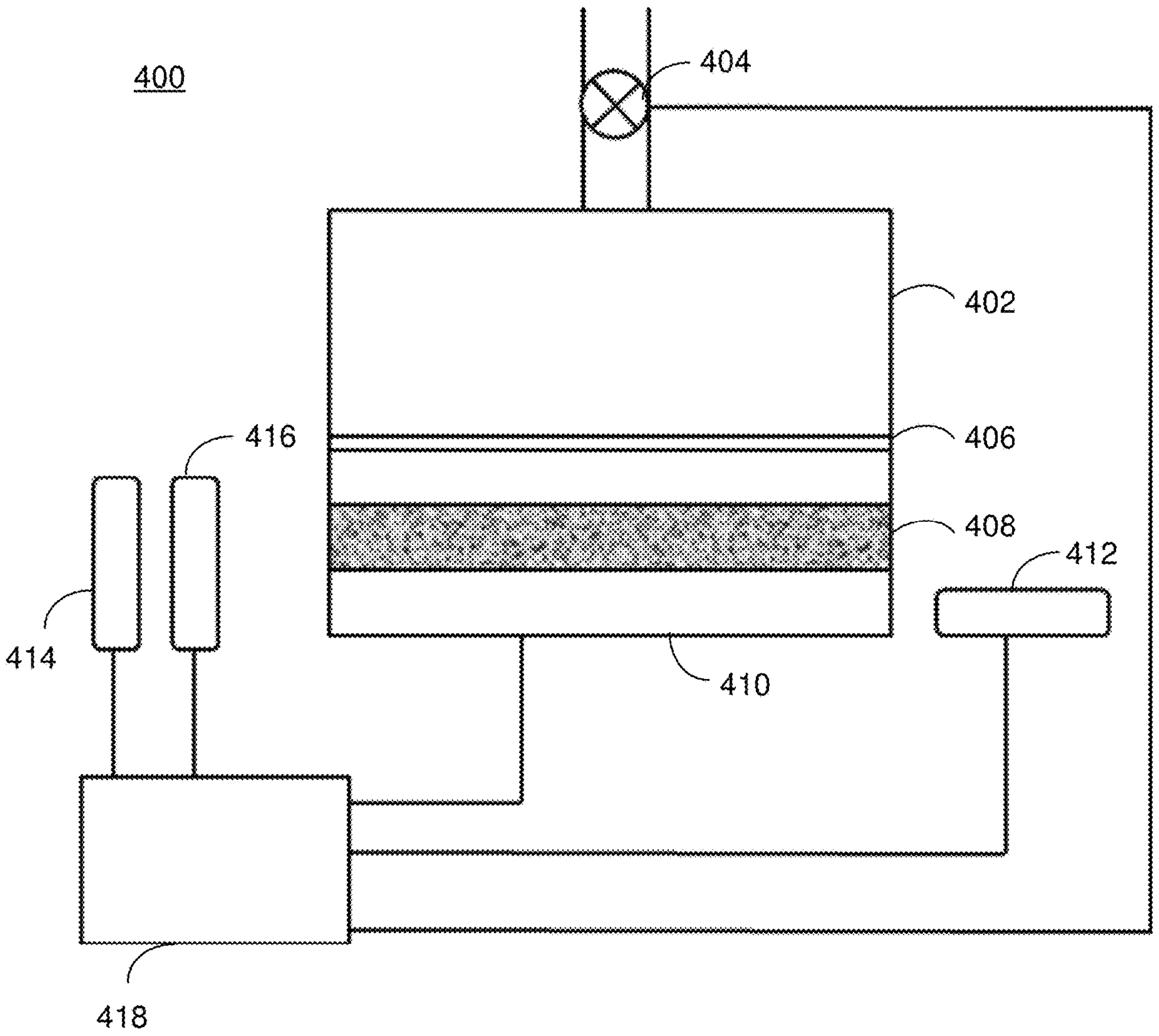
FIG. 4 is a schematic diagram of a controlled oxygenation module according to aspects of the disclosure.

FIG. 4 is a schematic diagram of an oxygenation module 400 according to an embodiment of the disclosure. The oxygenation module 400 includes a case or cell 402, the top of which has an outlet tube equipped with a valve 404. An $O_2$ permeable membrane 406 assures that none of the metal salen material 408 escapes from the module. A heating element 410 is inside the casing 402 or attached to the casing 402. An alternate way to heat the metal salen material would be by using a laser 412. Oxygen sensor 414 and temperature sensor 416 monitor the environment inside the HDD. The oxygen sensor 414 and temperature sensor 416 feed sensor data to the controller 418, which then operates the heater, laser and valve to modulate the amount of oxygen that is effused into the He atmosphere of the HDD. In one aspect, either the heater 410 or the laser 412, whichever is present in the oxygenation module 400, may act as a temperature control device to control the amount of heat, or lack of heat (e.g., cooling), applied to the metal salen material 408.

Figure 5:
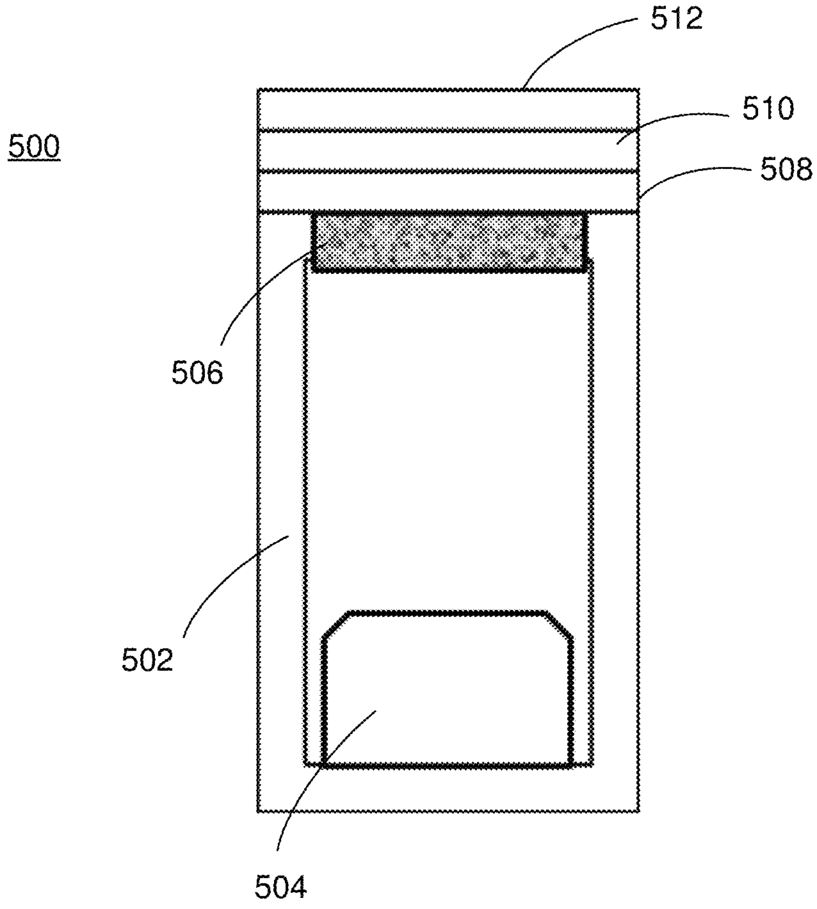
FIG. 5 is a schematic diagram of another design of an oxygenation module according to aspects of the disclosure.

FIG. 5 is a schematic diagram of another design of an oxygenation module according to aspects of the disclosure. The oxygenation module 500 includes a case or cell 502 that contains the metal salen based material 504. The top of the case 502 is sealed by an oxygen permeable membrane 506 which accesses a chamber 508 which defines a volume of oxygenated gas to be released. The chamber 508 leads to a porous cap 510 which can be a fritted grid or a porous material such as sintered stainless steel. The module can function passively or the oxygenated gas can be released by an optional valve 512.

The oxygen permeable membrane can be formed from a polymer such as cellophane, polythene, polytetrafluoroethylene, high-density polyethylene (HDPE) having a density of 0.93-0.97 g/$cm^3$, and low-density polyethylene (LDPE) having a density of 0.92-0.93 g/$cm^3$, polyvinyl acetate (PVA), ethylene vinyl acetate (EVA), polyurethane (PU), rubber, elastomer, etc. The oxygen permeable membrane can also be formed from an inorganic material or ceramic such as silica, zeolite, metal organic frameworks or perovskite. Perovskite-type and fluorite oxides are promising materials with high-oxygen ionic conductivity for oxygen permeation. Perovskite oxides are usually denoted as $ABO_3$-δ, where A-site ions usually are alkaline earth metal ions ($Ba^{2+}$, $Sr^{2+}$, $Ca^{2+}$) and/or lanthanide metal ions ($La^{3+}$, $Sm^{3+}$, $Ga^{3+}$, etc.). Fluorite oxides are often denoted as $MO_{2-\delta}$, and the typical fluorite oxides are $ZrO_2$, $CeO_2$, $Bi_2O_3$ and their alkaline earth or rare earth doped oxides. Mixed ionic/electronic conduction is required for oxygen transport through membranes. Typical membrane composition may include $Ln_{1-x}(Ba,Sr,Ca)_xCo_{1-y}Fe_yO_{3-d\delta}$ (Ln: lanthanide) or $Ba_{1-x}Sr_xCo_{0.8}Fe_{0.2}O_{3-\delta}$ and $La_{1-x}Sr_xCo_{1-y}Fe_yO_{3-\delta}$.

If the metal salen is present in particulate form, the particle size can be adjusted to modulate the release of oxygen, since decreasing particle size increases the overall surface area, i.e., increasing the particle size decreases the rate of oxygen evolution. Maximum oxygen evolution is expected at a mean particle size of 1-5 nm. If a lower oxygen evolution is desired, the particle size can be increased to micron or millimeter levels.

The metal salen can be coated on or inculcated into nanotubes. Carbon nanotubes can be single-walled carbon nanotubes (SWCNTs) which have diameters around 0.5-2.0 nm, about 100,000 times smaller than the width of a human hair. They can be idealized as cutouts from a two-dimensional graphene sheet rolled up to form a hollow cylinder. Multi-walled carbon nanotubes (MWCNTs) are formed of single-wall carbon nanotubes in a nested, tube-in-tube structure. Double-walled and triple-walled carbon nanotubes are special cases of MWCNT. Another carbonaceous nanomaterial is Buckminsterfullerene, a type of fullerene with the formula $C_{60}$. It has a cage-like fused-ring structure (truncated icosahedron) made of twenty hexagons and twelve pentagons, and resembles a football. Each of its 60 carbon atoms is bonded to its three neighbors.

The metal salen compound can be coated on or inculcated into zeolites, which are microporous, crystalline aluminosilicate materials commonly used as commercial adsorbents and catalysts. They mainly are formed of silicon, aluminum, and oxygen, and have the general formula $M^{n+}_{1/n}(AlO_2)$—$(SiO_2)_x$·$yH_2O$ where $M^{n+}_{1/n}$ is either a metal ion such as Na or H+. Zeolites have microporous structures with a typical diameter of about 0.3-0.8 nm. Like most aluminosilicates, the framework is formed by linking of aluminum and silicon atoms by oxides. This linking leads to a 3-dimensional network of Si—O—Al, Si—O—Si, and Al—O—Al linkages. The aluminum centers are negatively charged, which requires an accompanying cation. Zeolites can form naturally in nature. Some of the more common mineral zeolites are analcime, chabazite, clinoptilolite, heulandite, natrolite, phillipsite, and stilbite. An example of the mineral formula of a zeolite is: $Na_2Al_2Si_3O_{10}\cdot 2H_2O$, the formula for natrolite.

The metal salen material can be in the form of a tablet. Tablets are prepared either by molding or by compression of the metal salen material. Additives can include diluents, binders or granulating agents, glidants (flow aids) and lubricants to ensure efficient tableting. A polymer coating can be applied to make the tablet smoother and to control the release rate of oxygen. A binder may be added to help hold the tablet together and give it mechanical strength. A wide variety of binders may be used: some common ones are lactose, dibasic calcium phosphate, starch, microcrystalline cellulose, povidone polyvinylpyrrolidone and modified cellulose (for example, hydroxypropyl cellulose and hydroxyethyl cellulose, known as KLUCEL, which can have molecular weights ranging from 40,000 to 1,150,000).

In an embodiment, the metal salen material can be incorporated into a paint coating for the wall of the HDD casing. The paint can be acrylic, varnish or oil based paint. The active material can be dissolved into the paint, or dissolved in a solvent (which can be the activating solvent) that is then added to the paint. The coating can then be sprayed on, brushed on or printed on the wall of the HDD casing. A paint that does not contain pigment can be used. The active material can be encapsulated before being added to the paint, so as to modulate the absorption or release of oxygen. The encapsulating material can be a polymer such as polyvinylpyrrolidone, polyethylene glycol, acrylates, methacrylates, polymeric melamine-formaldehyde, etc. The paint can also be coated on the inside of the cell.

Modulating the release of oxygen can also be achieved by mixing the metal salen with inorganic materials. Single or mixtures of activated metal complexes provide the required oxygen releasing profile in HDD. The single or mixture of activated metal salen complexes mixes with other inorganic oxygen releasers. Metal complex(es) as oxygen modulators utilize its reversible oxygen adsorption/desorption property. At the start, the metal complexes may have no oxygen, but they absorb oxygen generated by the inorganic releasing agent and release oxygen slowly at elevated temperatures. One advantage is to prevent an oxygen surge by rapid oxygen release from inorganic compounds early in the lifetime of the HDD. The inorganic materials can include permanganates, for example $AgMnO_4$ (silver permanganate), and $KMnO_4$ (potassium permanganate), or percarbonates such as $Na_2H_3CO_6$ (sodium percarbonate) and $K_2H_3CO_6$ (potassium percarbonate) or peroxides such as $CaO_2$ and $MgO_2$.

In an embodiment, the starting metal complex(es) are partially or fully loaded with oxygen. They reach an equilibrium of releasing oxygen into the HDD and absorbing oxygen generated by inorganic compounds to keep HDD oxygen level constant at the optimum level. Oxygen release can be attained by the HDDs running temperature. The heating element can also be used to release oxygen. Optionally, a laser can create a local high temperature for quick oxygen release. The transition metal complexes can be disposed in a sealed chamber.

Oxygen Releasing Experiments

Oxygen releasing studies were conducted either in a HAMR drive with 10% oxygen in helium or in a 4-oz jar filled with 100% helium. The aim of the study was to understand the oxygen releasing profile for synthesized Co(salen), Co(3F-salen) and Co(5F-salen), and the mixture of oxygenated or deoxygenated Co(salen) with inorganic oxidants. With F substitution on salicylaldehyde, the oxygen releasing rate at 60° C. was very slow. However, at 80° C., the oxygen releasing rate increased greatly. These results, among other things, show that different materials have different effusion rates of oxygen. Mixing these materials and using different heating methods (heat from the HDD, heating block or laser irradiation) can be used to control the effusion of oxygen into the atmosphere of the HDD.

Figure 6:
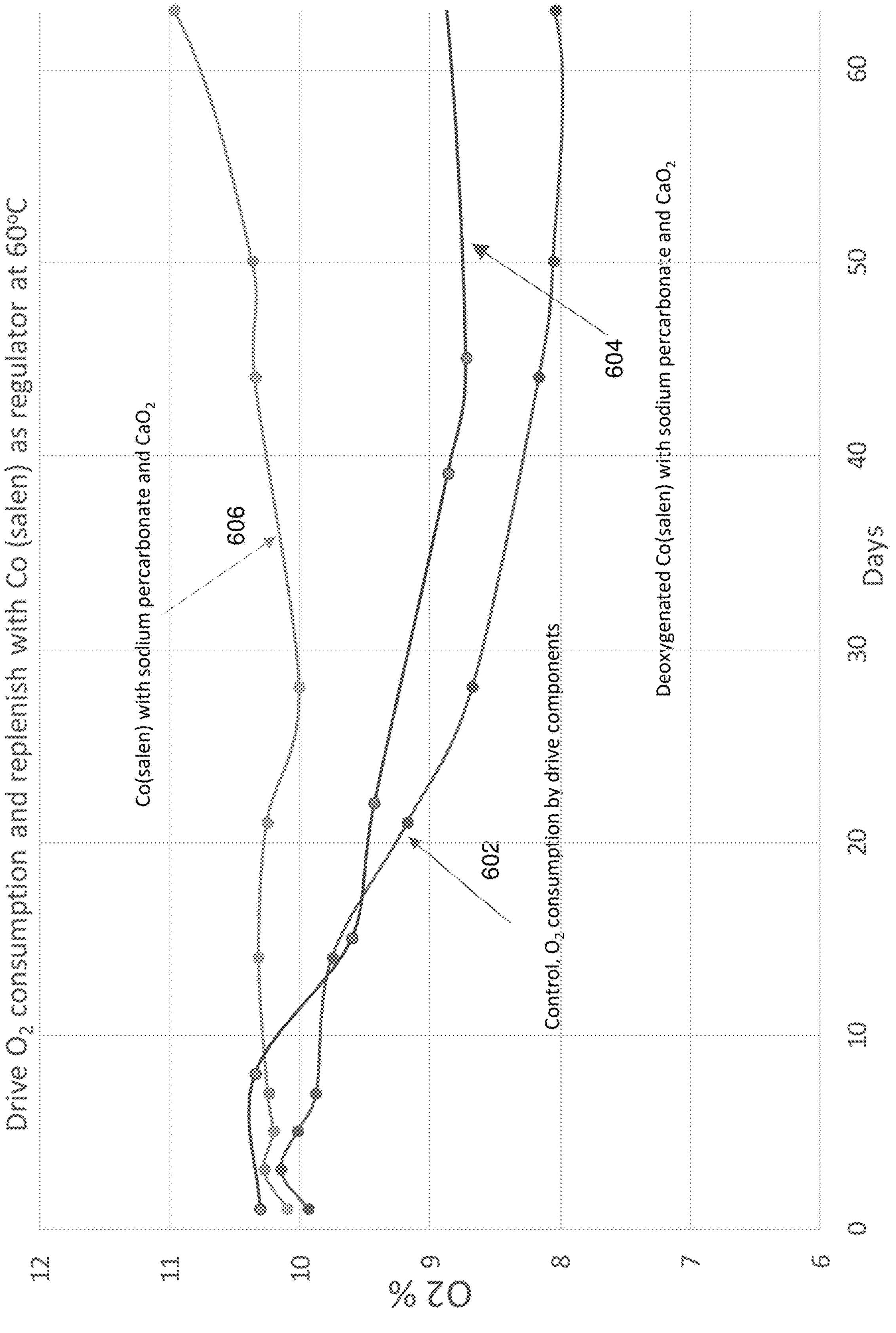
FIG. 6 is a chart showing HDD oxygen consumption and replenishment with oxygenated and deoxygenated Co(salen)

FIG. 6 is a chart showing oxygen consumption and replenishment with oxygenated and deoxygenated Co(salen) as a regulator in an HDD drive with 10% oxygen in helium, according to aspects of the disclosure. Line 602 shows the experimental control, $O_2$ consumption by the drive components. Line 604 shows the oxygen replenishment when deoxygenated Co(salen) with sodium percarbonate ($Na_2H_3CO_6$) and $CaO_2$ are used. In this case, Co(salen) is used as a regulator. Line 606 shows the oxygen replenishment when oxygenated Co(salen) with sodium percarbonate and $CaO_2$ are used. In this case, Co(salen) is used as an oxygen carrier and an oxygen regulator. Co(salen) mixed with sodium percarbonate and $CaO_2$ (line 606) shows a relatively stable level over a course of 60 days, with a slight increase between 50 and 60 days. The experimental results for the deoxygenation study are tabulated in Table 2. In real applications, the ratio of the components may be formulated in a way to have a stable level of oxygen throughout the lifetime of the drive.

TABLE 2

Oxygen levels for oxygenated and deoxygenated Co(salen) at 60° C. in HAMR drive.

| Day | Control (% $O_2$) | Oxygenated Co(salen) with $Na_2H_3CO_6$ and $CaO_2$ (% ($O_2$) | Deoxygenated Co(salen) with $Na_2H_3CO_6$ and $CaO_2$ (% ($O_2$) |
|---|---|---|---|
| 0 | 10 | 10.1 | 10.3 |
| 2 | 11 | 10.3 | |
| 4 | 10 | 10.2 | |
| 6 | 9.9 | 10.2 | 10.4 |
| 8 | 9.8 | | |
| 14 | | 10.4 | 9.8 |
| 15 | | | |
| 21 | 9.2 | 10.3 | |
| 22 | | | 9.5 |
| 28 | 8.7 | 10.0 | |
| 39 | | | 8.9 |
| 44 | 8.2 | 10.4 | |
| 45 | | | 8.8 |
| 50 | 8.0 | 10.4 | |
| 63 | 8.0 | 11.0 | |

The mean and standard deviations of the results were calculated, which can be seen in Table 3.

TABLE 3

Statistical results for the 60-day oxygenation results.

| Description | Mean (% $O_2$) | Standard Deviation |
|---|---|---|
| Control | 9.28 | 1.02 |
| Oxygenated Co(salen) with $Na_2H_3CO_6$ and $CaO_2$ | 10.3 | 0.27 |
| Deoxygenated Co(salen) with $Na_2H_3CO_6$ and $CaO_2$ | 9.61 | 0.68 |

The results show that oxygenated Co(salen) with $Na_2H_3CO_6$ and $CaO_2$ was the most consistent at maintaining the $O_2$ level at or near 10% with the lowest standard deviation in this particular experiment.

Table 4 shows the results of oxygen releasing study of Co(salen) and Co(3F-salen) at 60° C. in a helium filled glass jar. As can be observed, electron withdrawing F slows down the oxygen release. In real applications, the inventors have the potential to mixture different metal salen complexes to have the desired oxygen releasing profile.

TABLE 4

Results from 100% He in a 4-oz jar at 47 kPa at 60° C.

| | Day 0 | Day 1 | Day 13 | Day 28 |
|---|---|---|---|---|
| 111 mg Co(salen)-$CHCl_3$ Activation | 0% $O_2$ | 0.86% $O_2$ | 2.31% $O_2$ | 2.72% $O_2$ |
| 104 mg Co(3F-salen)-$CHCl_3$ Activation | 0% $O_2$ | 0.25% $O_2$ | 0.25% $O_2$ | 0.44% $O_2$ |

The results in Table 4 are graphed in FIG. 7, which shows the results for different substitution of Co(salen) in 100% He at 60° C. As can be seen, fluorine substitution on phenyl has effect on the speed of $O_2$ release.

An additional experiment was performed in a 100% He atmosphere at 80° C. for $CHCl_3$ activated Co(salen), $CHCl_3$ activated Co(3F-salen), and $CHCl_3$ activated Co(5F-salen). The results are tabulated in Table 5.

TABLE 5

| Results from 100% He in a 4-oz jar at 47 kPa at 80° C. | | | | |
|---|---|---|---|---|
| | Day 0 | Day 1 | Day 15 | Day 23 |
| 100 mg Co(salen)-$CHCl_3$ Activation | 0% $O_2$ | 1.41% $O_2$ | 1.5% $O_2$ | 1.71% $O_2$ |
| 136.5 mg Co(3F-salen)-$CHCl_3$ Activation | 0% $O_2$ | 1% $O_2$ | 1.54% $O_2$ | 1.67% $O_2$ |
| 100 mg Co(5F-salen)-$CHCl_3$ activation. | 0% $O_2$ | 0.03% $O_2$ | 0.43% $O_2$ | 0.75% $O_2$ |

The results in Table 5 are graphed in FIG. 8, which shows the results for different types and amounts of Co(salen) in 100% He at 80° C. As can be seen in FIG. 8, Co(salen) and Co(3F-salen) have almost equivalent performance at the end of the test period, to yield in excess of 1.6% $O_2$. In contrast, Co(5F-salen) has about half the performance to generate slightly less than 0.8% $O_2$ at the end of the test period.

Additional Aspects

Accordingly, using metal salen complexes to treat smear or other atmospheric problems generated within a HDD, according to aspects of this disclosure, may produce advantages such as an HDD with improved thermal stability/oxidation resistance, improved contamination robustness at sub-nanometer level, low profile for higher ADC with improved writability/readability, reasonable head wear and flyability performances, an improved bonding ratio, and improved processability/yields with an increased uniformity.

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also comprise some components other than those cited.

Unless otherwise specifically defined herein, all terms are to be given their broadest possible interpretation including meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, An $O_2$ content of 10% can have a variance of ±1%.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at." The term "and/or" refers to both the inclusive "and" case and the exclusive "or" case, and such term is used herein for brevity. For example, a composition comprising "A and/or B" may comprise A alone, B alone, or both A and B.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is directly on another component and/or in another component (e.g., directly on a surface of a component or embedded in a component). Thus, for example, a first component that is over the second component may mean that (1) the first component is over the second component, but not directly touching the second component, (2) the first component is directly on (e.g., directly on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. An oxygenating system for treating an atmosphere of a magnetic storage device, the system comprising:

an oxygenating material inside a sealed casing of the magnetic storage device, the oxygenating material comprising an oxygenated salen of formula (I):

(I)

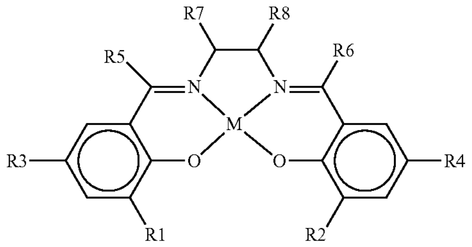

where M is a metal selected from Co, Ni, Mn, Fe or Cu, and R1, R2, R3, R4, R5, R6, R7 and R8 are independently H, F, Cl, Br, I, carbonyl, carboxyl, hydroxyl, alkyl, aryl, amine, amide, nitro, or an electron donating group or an electron withdrawing group.

2. The oxygenating system of claim 1, wherein R1 and R2 are F.

3. The oxygenating system of claim 1, wherein R1 and R2 are H.

4. The oxygenating system of claim 1, wherein M is Co and R1, R2, R3, R4, R5, R6, R7 and 8 are H, and the oxygenating material is referred to as Co(salen), wherein the Co(Salen) has at least one of the following crystalline structures:

γCo(salen);

δCo(salen);

εCo(salen); or

ζCo(salen).

5. The oxygenating system of claim 4, wherein more than one Co(salen) crystalline structure is present so as to effuse oxygen at different temperatures.

6. The oxygenating system of claim 1, wherein the oxygenating material further comprises at least one inorganic material selected from the group consisting of permanganates, peroxides, percarbonates and combinations thereof.

7. The oxygenating system of claim 1, wherein the oxygenating material comprises more than one of the oxygenated salen to control an oxygen releasing profile in the magnetic storage device.

8. The oxygenating system of claim 7, wherein the salen is Co(salen), and the Co(salen) is mixed with at least one of Co(3F-salen) and Co(5F-salen) to control the oxygen releasing profile.

9. The oxygenating system of claim 1:

wherein the oxygenating material is inside a cell inside the sealed casing of the magnetic storage device, and wherein an oxygen permeable membrane covers an opening in the cell.

10. The oxygenating system of claim 9, wherein the oxygen permeable membrane comprises at least one of low density polyethylene, high density polyethylene, ethylene vinyl acetate, polyurethane, polyvinyl alcohol, or isoprene rubber, and wherein the cell is gas-impermeable and comprises at least one of aluminum, steel, nickel, zinc or plastic.

11. The oxygenating system of claim 9, wherein the oxygenating material is in the form of a powder or tablets.

12. The oxygenating system of claim 9, wherein the oxygenating material is coated on zeolites or nanotubes.

13. A magnetic storage device comprising:

the oxygenating system of claim 9;

a temperature control device configured to control the temperature of the oxygenating material;

a temperature sensor;

a pressure sensor;

a valve configured to vent the cell; and a controller configured to control the temperature control device and the valve based on data from at least one of the temperature sensor or the pressure sensor, to control the temperature of the oxygenating material.

14. The magnetic storage device of claim 13, wherein the temperature control device comprises a laser inside the sealed casing, the laser being configured to heat the oxygenating material.

15. The magnetic storage device of claim 13, further comprising an oxygen sensor and the pressure sensor inside the sealed casing, and the sealed casing encloses an atmosphere containing He.

16. A magnetic storage device comprising:

the oxygenating system of claim 1;

at least one magnetic head inside the sealed casing;

a magnetic recording medium inside the sealed casing;

a drive mechanism for positioning the at least one magnetic head over the magnetic recording medium; and a controller electrically coupled to the at least one magnetic head for controlling operation of the at least one magnetic head.

17. The oxygenating system of claim 1, wherein the oxygenating material is incorporated into paint.

18. An oxygenating system for treating an atmosphere of a magnetic storage device, comprising:

an oxygenating material inside a sealed casing of the magnetic storage device, the oxygenating material comprising an oxygenated salen of formula (II):

(II)

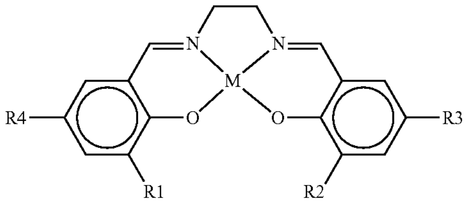

where M is a metal selected from Co, Mn, Fe or Cu, and R1, R2, R3 and R4 are independently selected from F, Br, I, Cl, an alkyl group, an electron donating group or an electron withdrawing group.

19. The oxygenating system of claim 18, wherein M is Co and R1, R2, R3 and R4 are independently H or F.

20. The oxygenating system of claim 18, wherein M is Co and R1, R2, R3 and R4 are H.

21. The oxygenating system of claim 18, wherein the oxygenating material comprises more than one of the oxygenated salen to control an oxygen releasing profile in the magnetic storage device.

22. The oxygenating system of claim 21, wherein the salen is Co(salen), and the Co(salen) is mixed with at least one of Co(3F-salen) and Co(5F-salen) to control the oxygen releasing profile in the magnetic storage device.

23. The oxygenating system of claim 18:

wherein the oxygenating material is inside a cell inside the sealed casing of the magnetic storage device, and wherein an oxygen permeable membrane covers an opening in the cell.

24. The oxygenating system of claim 18, wherein the oxygenated salen comprises formula (IIa):

(IIa)

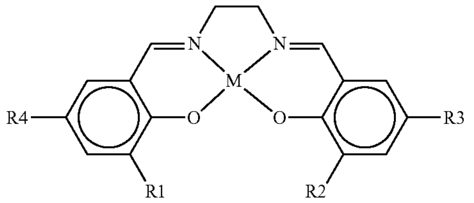

wherein M is Co and R1, R2, R3 and R4 are H, and the oxygenating material is referred to as Co(salen), wherein the Co(Salen) has at least one of the following crystalline structures:

γCo(salen);

δCo(salen);

εCo(salen); or

ζCo(salen).

25. The oxygenating system of claim 24, wherein more than one Co(salen) crystalline structure is present so as to effuse oxygen at different temperatures.

26. The oxygenating system of claim 24:

wherein the oxygenating material is inside a cell inside the sealed casing of the magnetic storage device, and wherein an oxygen permeable membrane covers an opening in the cell.

27. The oxygenating system of claim 26:

wherein the oxygenating material is in the form of a powder or tablets;

wherein the oxygenating material is coated on zeolites or nanotubes; or wherein the oxygenating material is incorporated into paint.

28. A magnetic storage device comprising:

the oxygenating system of claim 18;

at least one magnetic head inside the sealed casing;

a magnetic recording medium inside the sealed casing;

a drive mechanism for positioning the at least one magnetic head over the magnetic recording medium; and a controller electrically coupled to the at least one magnetic head for controlling operation of the at least one magnetic head.

* * * * *